United States Patent Office 3,005,234
Patented Oct. 24, 1961

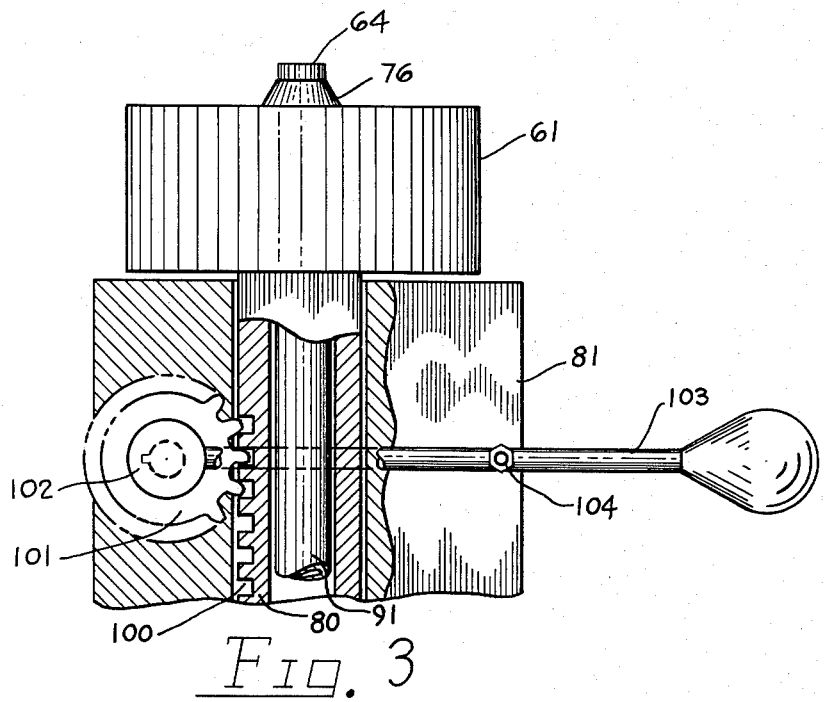
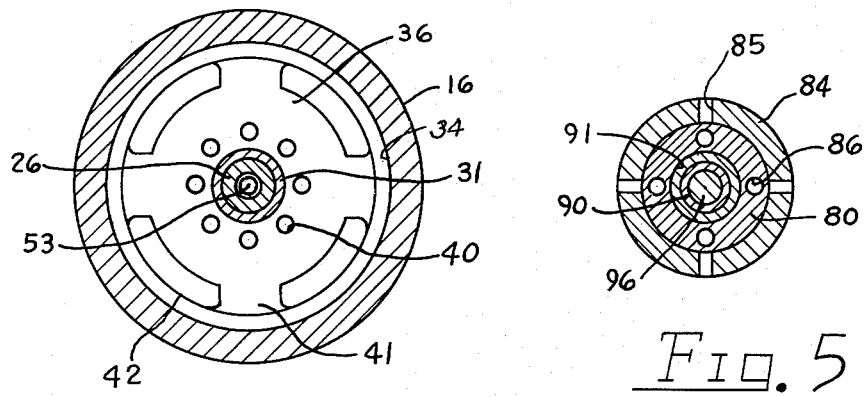

3,005,234
APPARATUS FOR MOLDING OPTICAL LENSES
Americo Oriani, Freeport, and Quido Cappelli, Bronx, N.Y., assignors to Danker & Wohlk, Inc., Brooklyn, N.Y., a corporation of New York
Filed July 6, 1959, Ser. No. 825,191
2 Claims. (Cl. 18—17)

This invention relates to the art of molding plastic material to predetermined shape by the use of heat and pressure with suitable dies. It relates more particularly to a novel thermo-compression of lenses which adhere to the cornea, as well as other optical lenses.

An important object of the invention is to provide a novel machine for molding corneal lenses of greater precision from transparent plastic materials wherein distortion of the work pieces is eliminated by a careful control of the applied melt during the actual molding as well as the application thereafter of a coolant such as cold air.

In the past it has been difficult to successfully produce lenses from plastic materials by a molding operation exclusively. This is especially true of tiny corneal lenses which are generally less than one-third of an inch in diameter and about .006 inch thick, and the difficulty is due primarily to the problem of controlling the flow of the plastic and of avoiding distortion of the finished product.

It is an object of the present invention to provide an improved machine which supports a pair of dies, one concave and the other convex, or both may be concave or convex, in such a manner as to assure a constant positioning of said dies during the entire molding operation as well as during succeeding operations, and to provide the desired conductivity required for the heat transfer, both for heating and for cooling the dies.

Yet another object of the invention is to provide an apparatus and method for producing precision molded plastic lenses of predetermined thickness, curvature and power, and which require no subsequent grinding and polishing operations on their optical surfaces.

In the drawings:

FIG. 3 is an enlarged section taken on line 3—3 of FIG. 2.

FIG. 4 is a section taken on line 4—4 of FIG. 2.

FIG. 5 is a section taken on line 5—5 of FIG. 2.

Figure 1:
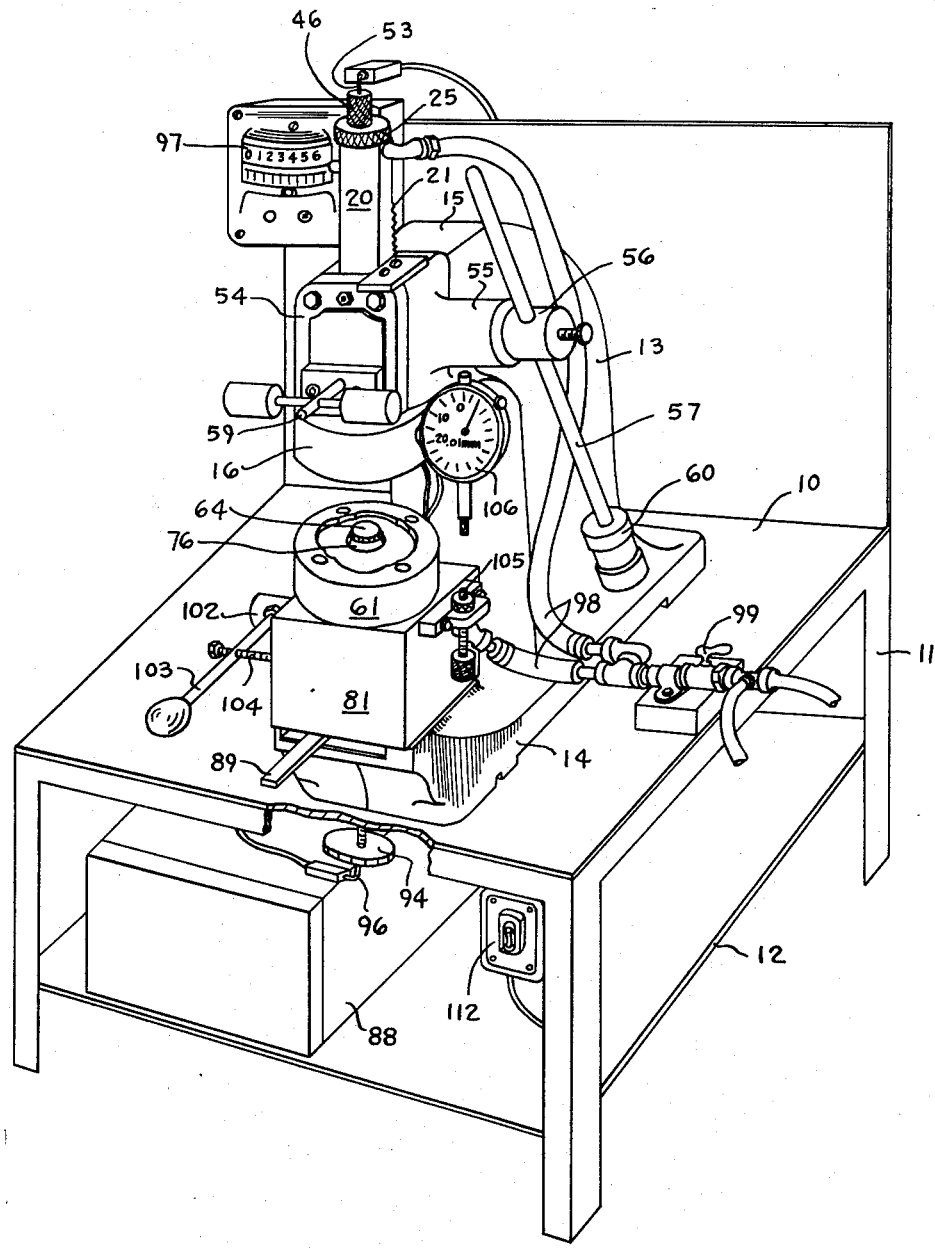
FIG. 1 is a perspective view of an apparatus embodying the present invention.

The molding apparatus of the present invention may be supported on a work table 10 having legs 11 and an intermediate shelf 12. An upright press frame 13, which may be a one-piece casting, has a base section 14 mounted on the work table and a forwardly extending head section 15 which supports the upper die assembly.

Figure 2:
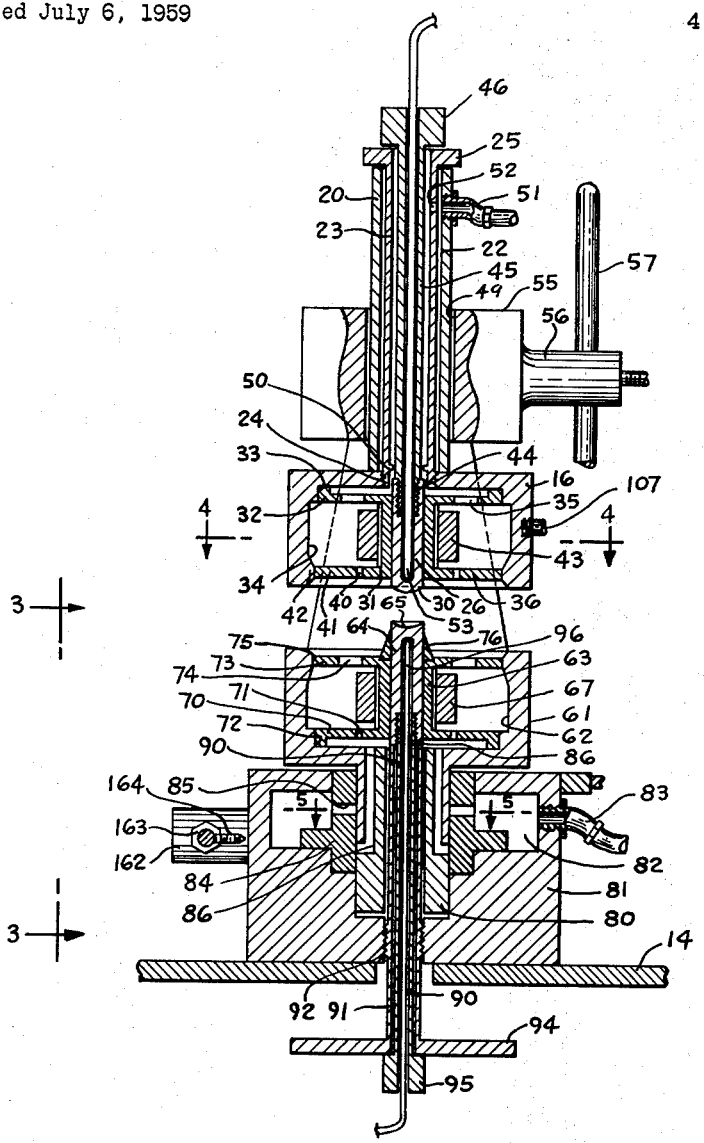
FIG. 2 is a vertical section taken through the upper and lower die assemblies and the supporting means therefor.

The details of this assembly are shown in FIGS. 2 and 4 and include an upper die casing 16 which may be circular in horizontal section. This die casing is mounted for vertical reciprocating travel at the lower end of a generally square plunger or guide shaft 20 having rack teeth 21 along its rear face. This plunger has a circular bore 22 extending from end-to-end and an elongated hollow screw 23, externally threaded at its lower end at 24, is received in a threaded opening the top wall of casing 16. At its upper end the hollow screw has a knurled head 25 and the parts are so proportioned that when the knurled head is screwed tightly against the upper end of square plunger 20, the upper face of casing 16 will be firmly held against the lower end of the plunger, thus securely mounting the die casing.

An upper die 26 with its optical face 30 extending downwardly is carried by the upper die assembly. The die is received in a tubular die guide or support 31. This die guide is formed with a plurality of upper radial flanges 32 received in a seat 33 in an opening 34 extending upwardly from the lower end of the upper die casing 16. Flanges 32 have openings 35 for the passage of a coolant such as cooled air. The die guide is further formed with a lower wall 36 have openings 40 through which the coolant passes. This wall has peripheral radial flanges 41 which engage an inwardly projecting annular seat 42 at the lower end of opening 34.

The tubular die support 31 has a heating element illustrated diagramatically at 43 surrounding the same. An electric heating element is preferred. Set screws (not shown) or other suitable means may be employed for securing the die guide within casing 16 and the die itself has a threaded opening 44 extending downwardly from its upper end and which received the lower threaded end of a second hollow screw 45 positioned within hollow screw 23 for securing the die casing to the plunger.

The upper end of second hollow screw 45 has a knurled head 46 which can be tightened against knurled head 25. Upward movement of the die 26 is limited by a suitable stop associated with the die assembly such as a shoulder 50 fixed as by welding within a hollow screw 23. The coolant enters the die assembly through a fitting 51 in plunger 20 and an opening 52 in hollow screw 23 permits the coolant to pass downwardly into the die casing. The outer diameter of screw 45 is less than the diameter of the bore in screw 23 to provide a passage for this coolant. The coolant may circulate around the upper and lower end of the die guide 31 and be vented through openings 40 in lower wall 36.

The opening 44 in the die has an unthreaded portion extending downwardly the major portion of its length which receives a thermocouple 53 responsive to the temperature of the die.

Plunger 20 is mounted in a vertical opening 49 in head 15, the opening being closed by means of a front plate 54. A boss 55 extending to one side of the head forms a journal support or bearing for a shaft 56 on which a pinion (not shown) is fast. The shaft is rotated by a hand lever 57 having a handle 60 at one end thereof. As the shaft is rotated the pinion moves the plunger with its upper die assembly up or down. A manually rotatable screw 59 locks the plunger against movement when the machine is not in use.

The lower die assembly includes a die casing 61 having an opening 62 for a tubular die guide 63 which receives and supports lower die 65 with its optical face 66 extending upwardly. The die is heated by a suitable heating element 67. The die guide has radially extending arms 70 and vents 71 and which is supported in a seat 72. An upper section 73 has openings 74 and is received in a seat 75. This upper section also has a central recess forming a support for a combined cutting tool and dam 76 for the fluid plastic located between the die faces.

The die casing 61 has a lower extension or shank 80 which is recessed for sliding vertical movement within a block-like support 81 mounted on and forming part of the frame. This support has a chamber 82 for the coolant which enters through a fitting 83. A bushing 84 has ports 85 and when the lower die casing 61 is raised its maximum distance the lower terminals of ports 86 in shank 80 become aligned with ports 85 and permit the coolant to pass upwardly and cool the lower die.

The die 64 has a threaded opening 86 which receives the upper threaded end of a hollow screw 90 and the lower end of the die rests against the upper end of a second hollow screw mounted concentrically of screw 90. The outer screw 91 has an externally threaded section 92 which engages internal threads in a lower central opening in block 81. This screw further has a hand wheel 94 at its lower end. Inner hollow screw 90 has a knurled head 95 at its lower end and when this head is tightened against head 94 the lower die is securely mounted in screw assembly 90—91. When the hand wheel 94 is turned the die moves up or down relative to cutting knife 76. A hand lever 89 may be employed to lock screw 91 against rotation.

The lower die is also hollow to receive a thermocouple 96. A meter 97 may be mounted on a rear wall of the table to give a reading of the temperature of the dies. The coolant is supplied to upper and lower fittings 51—83 through hoses 98 and its flow is controlled by valve 99. The coolant source may be positioned within a housing 88.

The shank 80 of the lower die casing has rack teeth 100 which are engaged by a pinion 101 fast on a shaft 102 which is rotated by hand lever 103. A pointer 104 serves as a reference marker for the operator.

In order to control the thickness of the lenses an adjustable micrometer 106 is mounted on the upper die casing at 107 (FIG. 2) and a corresponding adjustable stop 105 is mounted on the press stand. When the press is closed and the upper and lower dies are in contact with each other, the micrometer is adjusted so that it will read "zero." Then the adjustable stop is moved so that it will raise the plunger until the reading of the micrometer corresponds to the required lens thickness. In this fashion the distance between the upper and lower dies can be controlled exactly.

The operation of the apparatus is as follows: The height of the lower die is adjusted so that it projects slightly above the cutting edge of knife 76, i.e., substantially the position shown in FIG. 2. Since a different set of dies is used for each prescription this adjustment is frequently necessary because of the different lengths of the dies due to varying amounts of hand work during their preparation.

Figure 6:
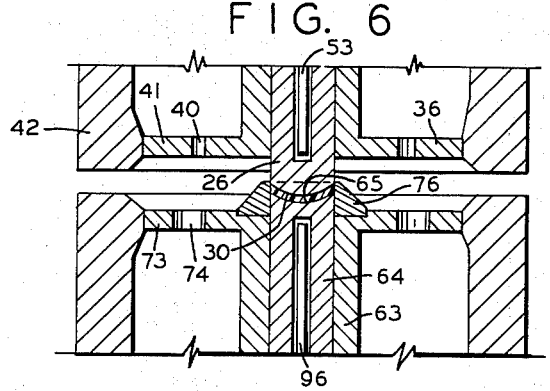
FIG. 6 is an enlarged broken section showing the position of the dies during melting of the plastic material with the dam in raised position and preventing outward flow of the plastic mass.

Lever 103 is then raised to a point where the upper edge of the knife is a distance above the upper annular edge of the die by an amount somewhat in excess of the thickness of the finished lens. A measured quantity of the plastic is then placed in the lower die and the cutter forms a dam around the die. The hand lever is now actuated to bring the upper die down on the plastic mass and the circuit controlling operation of heating elements 43—67 closed by means of closing switch 112. This is the position of the parts shown in FIG. 6 and in this position of the dies and the dam, the plastic material is being heated and compressed.

Figure 7:
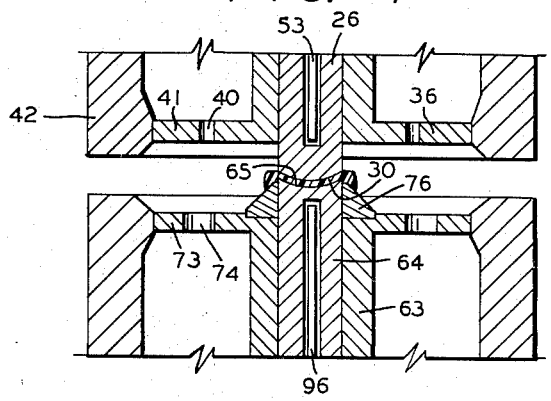
FIG. 7 shows the excess plastic mass having flowed from the die cavity after the dam has been lowered.
Figure 8:
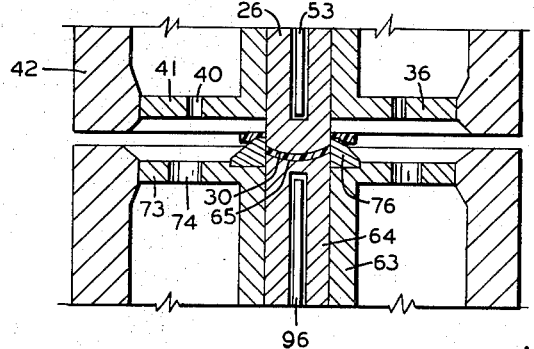
FIG. 8 shows the final position of the parts with the work piece in its finished thickness with the dam raised and its knife edge having trimmed the excess material from the lens.

The lever arm 57 is now extending forwardly of the machine and a suitable weight is attached to the handle 60. As the plastic begins to melt lever arm 57 begins to fall due to the weight of handle 60 and, if desired, an additional weight may be attached to the handle. When the movement stops, lever arm 103 is lowered as shown in FIG. 7 to lower the dam formed by the cutting element surrounding the lower die. This permits the excess material in the plastic mass to pass out of the area between the die faces and as soon as the pointer of the previously set micrometer registers "zero" lever arm 103 is again moved upwardly which performs two functions as shown by the position of the parts in FIG. 8: (1) it cuts all the excess plastic lying outside the die area; and (2) it again forms a dam to prevent further flow of the plastic. On this second actuation of lever 103, it is raised further than it was the first time, i.e., far enough to align ports 85 and 86. In this latter position the two casings are in substantial meeting engagement.

The heating elements are now turned off and valve 99 is actuated to cause the coolant to flow through both die casings and cool the dies and the plastic lens therebetween. The lens is now complete and the only finishing required is the trimming and polishing of the periphery of the lens by means of a polishing tool.

While there have been described herein what are at present considered preferred embodiments of the invention, it will be obvious to those skilled in the art that many modifications and changes may be made therein without departing from the essence of the invention. It is therefore to be understood that the exemplary embodiments are illustrative and not restrictive of the invention, the scope of which is defined in the appended claims, and that all modifications that come within the meaning and range of equivalency of the claims are intended to be included therein.

We claim:
1. An apparatus for molding lenses from plastic materials including, in combination, a press frame, upper and lower die assemblies including vertically aligned dies formed with die faces, the upper die assembly being mounted for vertical sliding movement in the frame and a hand lever for moving the same towards and away from the lower die, heating and cooling means associated with each die, the lower die assembly including a die casing surrounding the lower die and being vertically movable independently of said lower die, a sleeve mounted on said die casing and closely fitting the side walls of the lower die to form a dam element around said die for the plastic material while the latter is being heated to a molten state, said sleeve being formed with an upper annular cutting edge to trim excess plastic material from the aligned dies after the lens has achieved a desired thickness, and micrometer means for indicating said thickness of the lens as the molten plastic material flows outwardly from the die faces, whereby upward movement of the die casing and sleeve simultaneously stops such flow and trims said excess material.

2. The structure recited in claim 1 and wherein means are provided for vertically adjusting the position of the lower die in the frame.

References Cited in the file of this patent

UNITED STATES PATENTS

| | | |
|---|---|---|
| 49,969 | Brown | Sept. 19, 1865 |
| 673,847 | Ruckl | May 7, 1901 |
| 1,793,089 | Heyes | Feb. 17, 1931 |
| 1,880,874 | Derry | Oct. 4, 1932 |
| 2,126,771 | Hanson | Aug. 16, 1938 |
| 2,260,667 | Hoof | Oct. 28, 1941 |
| 2,432,668 | Kingston | Dec. 16, 1947 |
| 2,858,568 | Myerson | Nov. 4, 1958 |